United States Patent
Chang et al.

(10) Patent No.: US 7,761,744 B2
(45) Date of Patent: Jul. 20, 2010

(54) DEBUGGING METHOD

(75) Inventors: Chao-Hung Chang, Changhua County (TW); Po-Chou Chen, Taipei (TW); Ming-Lun Liu, Taipei County (TW)

(73) Assignee: Industrial Technology Research Institute, Hsinchu (TW)

(*) Notice: Subject to any disclaimer, the term of this patent is extended or adjusted under 35 U.S.C. 154(b) by 484 days.

(21) Appl. No.: 11/798,430

(22) Filed: May 14, 2007

(65) Prior Publication Data
US 2008/0229141 A1    Sep. 18, 2008

(30) Foreign Application Priority Data
Mar. 14, 2007    (TW) .............................. 96108717 A

(51) Int. Cl.
*G06F 11/00*    (2006.01)
(52) U.S. Cl. .............................. 714/27; 714/30; 714/37; 714/45
(58) Field of Classification Search .................. 714/27, 714/30, 37, 45
See application file for complete search history.

(56) References Cited

U.S. PATENT DOCUMENTS

| | | | | |
|---|---|---|---|---|
| 5,978,937 A * | 11/1999 | Miyamori et al. | .............. | 714/45 |
| 6,311,292 B1 * | 10/2001 | Choquette et al. | .............. | 714/30 |
| 6,446,221 B1 * | 9/2002 | Jaggar et al. | .................. | 714/30 |
| 7,080,283 B1 * | 7/2006 | Songer et al. | ................. | 714/30 |
| 7,600,155 B1 * | 10/2009 | Nickolls et al. | ............... | 714/38 |
| 2005/0165597 A1 * | 7/2005 | Nightingale | ................. | 703/27 |
| 2007/0101320 A1 * | 5/2007 | Tang et al. | .................. | 717/161 |
| 2008/0229141 A1 * | 9/2008 | Chang et al. | ................... | 714/3 |

* cited by examiner

*Primary Examiner*—Emerson C Puente
(74) *Attorney, Agent, or Firm*—Birch, Stewart, Kolasch & Birch, LLP

(57) ABSTRACT

The invention provides a debugging method applicable for an embedded system. The system includes a processor, a main memory and a debugging interface. A debugging program is first provided in the main memory. A debugging interruption is subsequently triggered to cause the processor to read the debugging program from the main memory and execute the debugging program. After execution, an execution result of the debugging program is stored into the main memory. The execution result is read and output via the debugging interface for further analysis. Because the architecture does not require a scan chain of ITR 104, the circuit requirement is reduced while performance is increased.

10 Claims, 4 Drawing Sheets

DEBUGGING METHOD

BACKGROUND OF THE INVENTION

1. Field of the Invention

The invention relates to a debugging method, and particularly, to an accurate and efficient debugging method for a digital signal processor (DSP) development board.

2. Description of the Related Art

FIG. 1 shows the architecture of a conventional board platform 100. Embedded cores such as MPU or DSP cores are typically used in a conventional embedded system. A hardware emulator platform such as board platform 100 of FIG. 1 is typically utilized to trace bugs and estimate performance during core development. In the board platform 100, a processor 110 operates at frequency PCLK, and a debugging interface 130 operates at frequency TCK. Instructions executed by the processor 110 are selected from one of two sources via a prefetch 106. In normal mode, instructions sent from the instruction memory 122 are selected and passed to the processor 110. In debugging mode, the debugging interface 130 fetches a debugging program via a JTAG interface using a scan chain. The debugging program is first buffered in an instruction transfer register (ITR) 104, and then passed to the processor 110 by the prefetch 106. The debugging interface 130 is typically coupled to a debugger 140 or an external computer host. Thus, operations of the processor 110, including stop, step-by-step run, interruption point configuration, and memory accessibility can be fully controlled. Furthermore, a plurality of registers 112 implemented in the processor 110, are externally accessible via the debugging interface 130 as well as the main memory 120.

FIG. 2 is a flowchart of a conventional debugging method. The left side represents operations of the processor 110 at the frequency PCLK. In step 200, the board platform 100 is triggered by a trigger signal to enter a debugging mode. The processor 110 first stops the current normal operation, and waits until execution of all instructions queued in the pipelines 114 is complete. In step 202, the processor 110 enters a recursive waiting state, to wait for a debugging instruction to be passed from the ITR 104. On the other hand, when the board platform 100 enters the debugging mode in step 200, the debugging interface 130 processes step 212 to send externally input debugging instructions to the ITR 104. In step 214, when a debugging instruction is filled in the ITR 104, the debugging interface 130 delivers a ready signal to the processor 110, causing the processor 110 to exit the waiting state in step 202 and proceed to step 204. The debugging interface 130 subsequently processes step 216, an empty loop, to wait for an execution successful signal. In step 204, the processor 110 reads and executes the debugging instruction from the ITR 104. During the empty loop, any instruction associated data or parameters available in the data transfer register (DTR) 102, are read by the processor 110. In step 206, an execution successful signal is delivered when the processor 110 completes execution of the debugging instruction, and the debugging interface 130, in response, exits the waiting loop of step 216. Subsequently, in step 218, the debugging interface 130 issues a clear signal to indicate the current debugging instruction execution cycle has concluded. The debugging interface 130 then returns to step 212, to wait for the next debugging instruction to be sent from the debugging interface 130. The processor 110 simultaneously returns to step 202 to wait for another debugging instruction when conclusion of execution cycle is confirmed in step 208.

Because the frequencies PCLK and TCK are not identical, both parties rely on the waiting loops for handshake synchronization. Steps 202 to 218 are referred to as a round, during which only one debugging instruction can be input and executed to process only a predetermined amount of data. If the debugger 140 wants to write massive data to the data memory 124, a plurality of rounds are required to sequentially process the massive data, inefficiently consuming significant time and system resource. Thus, a debugging method for improving the efficiency is desirable.

BRIEF SUMMARY OF THE INVENTION

An exemplary debugging method is provided, applicable for an embedded system comprising a processor, a main memory and a debugging interface. First, a debugging program is provided in the main memory. A debugging interruption is triggered on precise time to cause the processor to execute the debugging program from the main memory. After execution, an execution result of the debugging program is stored in the main memory. The execution result is subsequently read and output via the debugging interface for further analysis.

An access allowable flag is further delivered upon completion of storage of the execution result storage. The debugging interface reads the execution result from the main memory when receiving the access allowable flag. The debugging interface may further monitor a state register. When execution of the debugging program is complete, the access allowable flag is stored into the state register. Thus, in response, the debugging interface reads the execution result from the main memory.

The debugging interruption may be triggered when the processor runs to a program counter. A shadow register may be used to temporarily backup processor register values, and the debugging program may copy contents of the shadow register to the main memory as a part of the execution result.

When the debugging interface obtains the execution result, a conclusion signal is issued, and the processor restores register values from the shadow register upon receipt of the conclusion signal. A state register is used to store the conclusion signal. When the debugging program is concluded, the debugging interface stores the conclusion signal in the state register upon receipt of the execution result. The processor then restores the processor register values from the shadow register upon detection of the conclusion signal.

The embedded system that implements the debugging method is coupled to the debugging interface conforming to the JTAG standard. Any other board platform such as a development board is also adoptable for the debugging method, where the development board is referred to as a simulation environment of an embedded system. The processor may be an ARM instruction processor, preferably a PACDSP. The main memory comprises an instruction memory storing instructions to be processed by the processor, and a data memory storing data associated with the instructions. The execution result is stored in the data memory while the debugging program is stored in the instruction memory. The debugging interruption may be issued by a device an externally coupled to the debugging interface when the program counter satisfies a predetermined condition, or when the embedded system is interrupted by an externally coupled device. A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3:
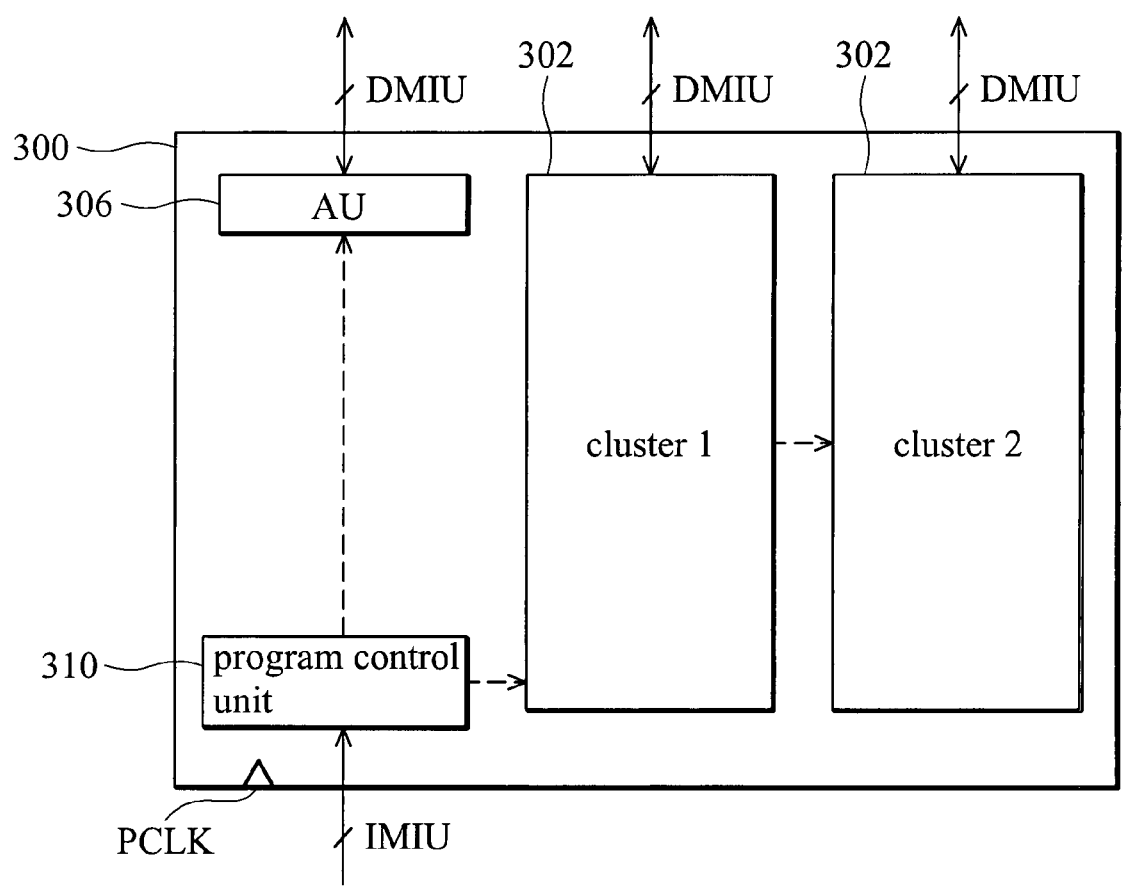
FIG. 3 shows an architecture of a processor 300.

FIG. 3 shows architecture of a processor. The processor 300 may be a VLIW type, comprising both MPU and DSP capabilities utilizing distributed register file clusters, which also referred to as a PACDSP. The processor 300 may comprise a plurality of clusters 302 each has various function units such as Load/Store unit or Arithmetic unit. Each function unit may further be associated with a dedicated private register file (not shown). An arithmetic unit (AU) 306 is capable of processing simple mathematic operations, address calculation and program control. A program controller 310 controls the resource dispatch of processor 300, assigning different types of instructions to corresponding function units. Instruction associated data are transferred to the function units via a data memory interface unit (DMIU). Instructions are sent via an instruction memory interface unit (IMIU).

Figure 4:
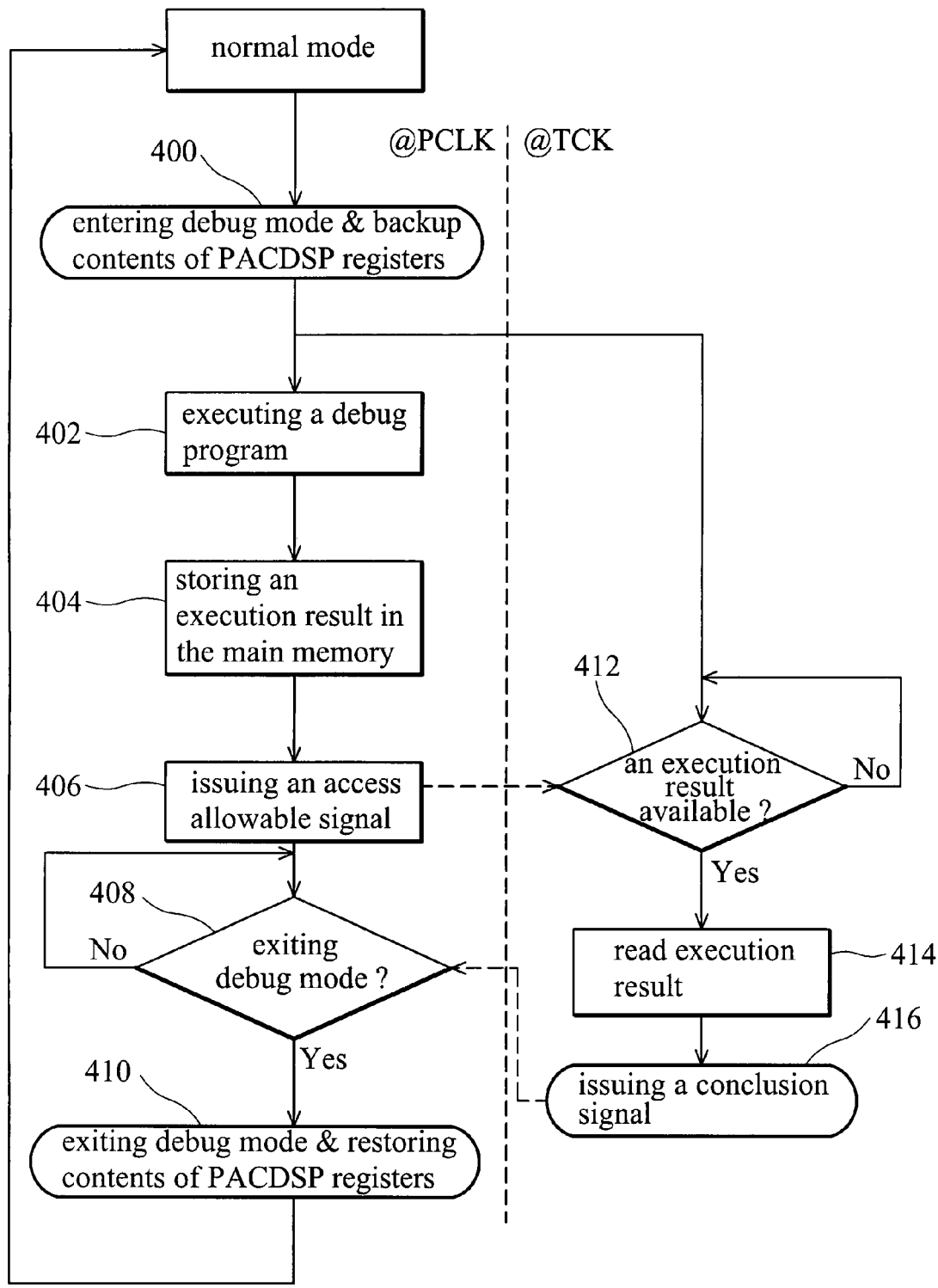
FIG. 4 is a flowchart of an embodiment of a debugging method.

FIG. 4 is a flowchart of an embodiment of a debugging method, suitable for a board platform 100 using the processor 300. Contrary to a conventional sequential scan chain, the embodiment provides a batch processing method for efficiently executing a massive number of debugging instructions. Specifically, a software debugging procedure, triggered by an interruption when necessary, is provided. The method requires less circuit area, and improves the debugging performance. Intentional trigger points for debugging interruption may be provided. When the processor 300 detects the trigger points during normal program execution, an interruption is issued to enter the debugging mode.

In FIG. 4, the processor 300 and the debugging interface 130 individually operate at different frequencies PCLK and TCK, each processing different steps. In step 400, the processor 300 jumps to an entry point of a debugging program when triggered by a debugging interruption. The program counter and register contents at the moment are simultaneously stored for backup. A typical processor 300 may have a shadow register (not shown) backing up the interrupted register contents for further restore. In step 402, the debugging program is initialized to perform various routing tests. In the embodiment, the debugging program is stored in the instruction memory 122, and passed to the processor 300 by a prefetch 106. Contrary to the conventional scan chain using ITR 104, the debugging program of the embodiment is massively transferred to the processor 300, significantly increasing the efficiency and performance. Furthermore, the processor 300 is capable of simultaneously processing various types of instructions by various function units, thus the massive input of debugging instructions can take full advantage of the processor 300. In step 404, an execution result of the debugging program is stored in the main memory 120. More specifically, the execution result is stored in the data memory 124 of the main memory 120 by the processor 300 over the DMIU. In step 406, upon completion of the execution result storage, an access allowable flag is issued to notify the debugging interface 130 (or an external host) that an execution result is available and accessible in the data memory 124. The access allowable flag may be represented by a state register with a specified value. For example, the debugging interface 130 recursively monitors the state register, and reacts immediately when the value of the register changes. In step 408, the processor 300 enters a waiting loop to wait for a conclusion signal from the debugging interface 130 (or the external host) that indicates the conclusion of the debugging mode. In step 410, when the conclusion signal is issued, the processor 300 returns to normal mode, and all the register contents are restored to the processor 300.

Figure 1:
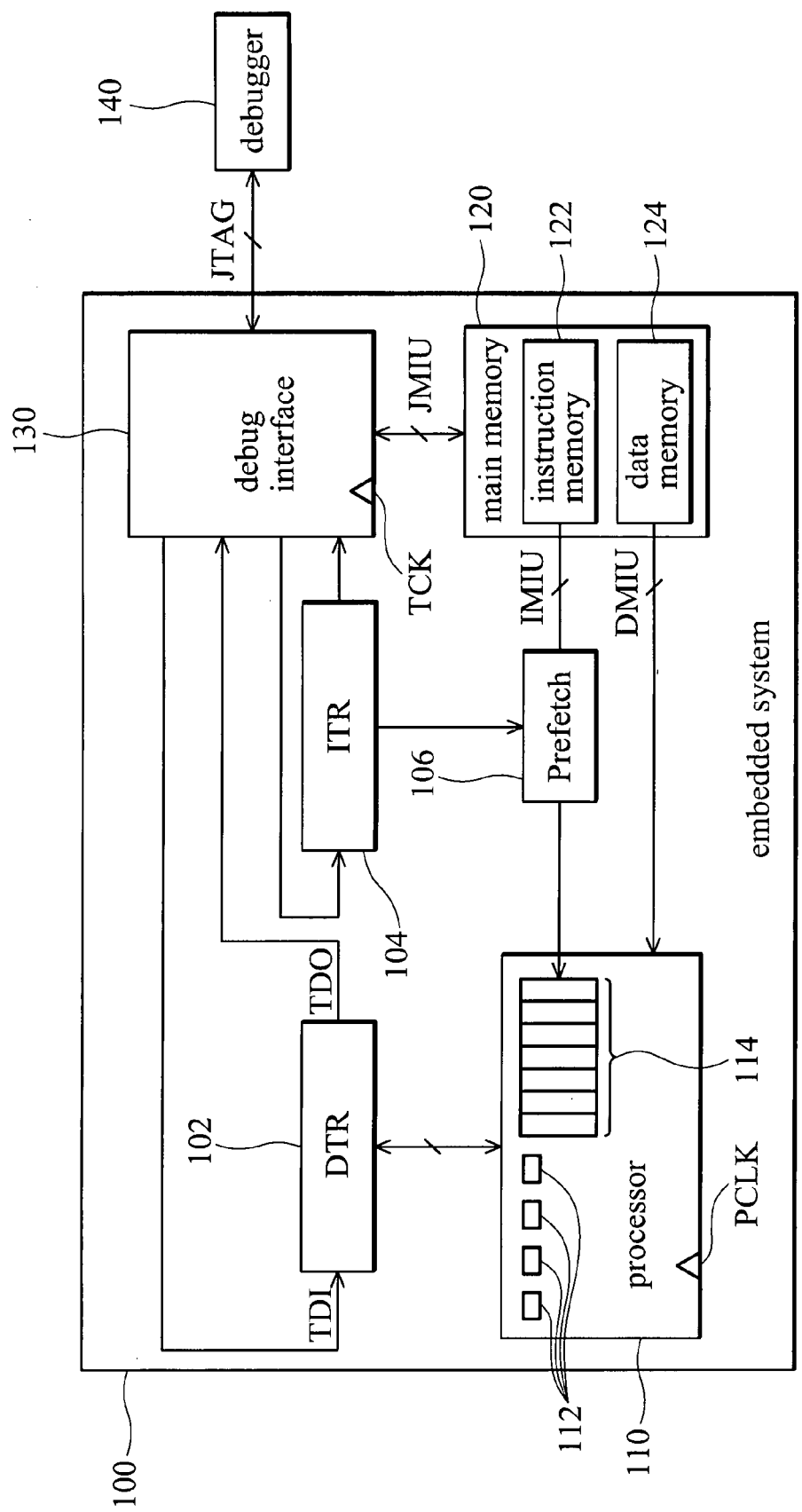
FIG. 1 shows the architecture of a conventional board platform 100.
Figure 2:
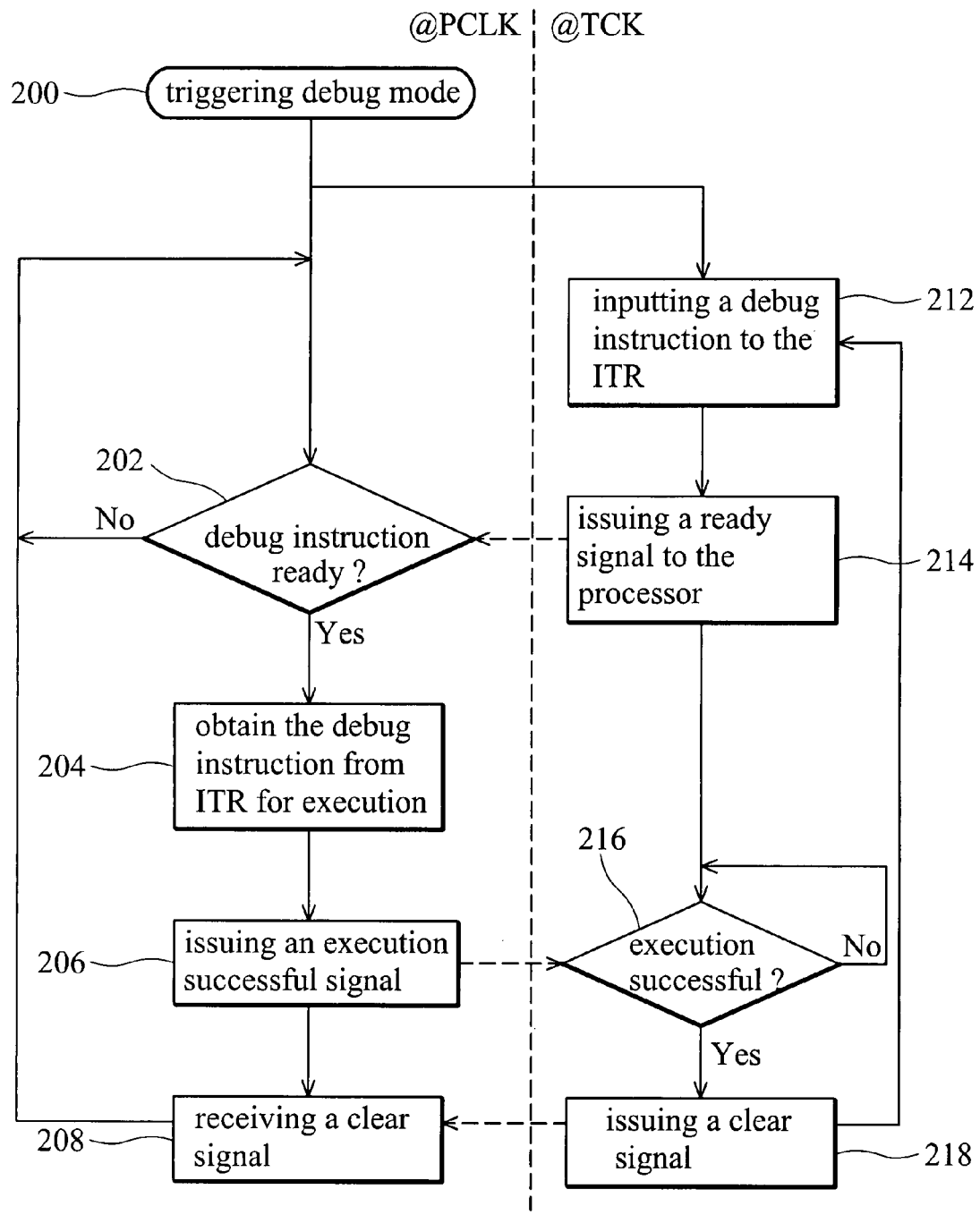
FIG. 2 is a flowchart of a conventional debugging method.

On the other hand, simultaneous to initialization of the debugging mode in step 400, the debugging interface 130 enters a waiting state in step 412, to wait for the execution result to be generated. When an access allowable flag is issued, the debugging interface 130 (or the external host) processes step 414 to read the execution result stored in the data memory 124 of main memory 120 via a direct path marked as JMIU in FIG. 1. When the execution result is fully output, a conclusion signal is issued in step 416, directing the processor 300 to conclude the debugging mode. The debugging procedure thus completes.

Because the processor 300 triggers the debugging mode by an interruption, the interruption point can be accurately assigned to a specific program counter. Before the debugging program begins, the processor 300 drains out previously queued instructions in the pipeline stages. Contrary to conventional round by round instruction execution, the embodiment executes a batch of instructions by triggering one interruption, wherein the debugging program is referred to as a compiled form of the batch of instructions.

In order to trace bugs, observation of the register contents of processor 300 is essential. Thus, the debugging program may copy contents of the shadow register and the data registers to the memory as a part of the execution result.

In some embodiments, the board platform 100 may be a development board coupled to an external host or a debugger 140 via a debugging interface 130. The DTR 102 in the board platform 100 may also be used as a state register to indicate a status inside the board platform 100. For example, the conclusion signal issued in step 416 may also be stored in the DTR 102, thus the processor 300 keeps monitoring the DTR 102 after step 406 until the conclusion signal is detected, and exits the debugging mode after register contents are restored to the processor 300 from the shadow register.

The processor 300 may be an ARM instruction set processor, particularly a PACDSP, however the invention is not limited thereto. The main memory 120 in FIG. 1 may comprise instruction memory 122 and data memory 124. The instruction memory 122 is dedicated for storage of executable instructions, such as the debugging program. The execution result is put in the data memory 124. The debugging mode is not limited to being triggered by an interruption. The processor 300 may issue the debugging interruption when the program counter satisfies a predetermined condition during normal program execution, or forcibly may be interrupted by the debugger 140 or an externally coupled host. In summary, the embodiment shows a software based method that does not require a scan chain of ITR 104, therefore, no more hardware modification is required, and the performance can be increased without extra cost.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A debugging method for an embedded system comprising a processor, a main memory and a debugging interface, the debugging method comprising:
    providing a debugging program in the main memory;
    triggering a debugging interruption, causing the processor to read the debugging program from the main memory and to execute the debugging program;
    storing an execution result of the debugging program into the main memory;
    reading the execution result and outputting it via the debugging interface for further analysis;
    triggering the debugging interruption based on a program counter, wherein the processor comprises a plurality of pipeline stages for cooperatively processing instructions;
    the processor copying processor register values corresponding to the program counter to a shadow register, wherein the debugging program copies content of the shadow register to the main memory as the execution result;
    delivering a conclusion signal when the debugging interface obtains the execution result; and
    restoring the processor register values from the shadow register upon detection of the conclusion signal.

2. The debugging method as claimed in claim 1, further comprising:
    setting an access allowable flag of a state register upon completion of storage of the execution result; and
    the debugging interface reading the execution result from the main memory when detecting that the access allowable flag is set.

3. The debugging method as claimed in claim 2, further comprising:
    the debugging interface recursively monitoring the state register; and
    the debugging interface reading the execution result from the main memory when detecting that the allowable flag in the state register is set.

4. The debugging method as claimed in claim 1, further comprising:
    the processor recursively monitoring a state register when the debugging program is concluded;
    the debugging interface storing the conclusion signal in the state register upon receipt of the execution result; and
    the processor restoring the processor register values from the shadow register upon detection of the conclusion signal.

5. The debugging method as claimed in claim 1, wherein the embedded system is a development board, coupled to the debugging interface using a JTAG standard.

6. The debugging method as claimed in claim 1, wherein the processor is an ARM instruction processor.

7. The debugging method as claimed in claim 1, wherein the processor is a PACDSP.

8. The debugging method as claimed in claim 1, wherein the main memory comprises:
    an instruction memory, storing instructions to be processed by the processor, wherein the debugging program is stored in the instruction memory; and
    a data memory, storing data associated with the instructions, wherein the execution result is stored in the data memory.

9. The debugging method as claimed in claim 1, wherein a device externally coupled device to the debugging interface triggers the debugging interruption.

10. The debugging method as claimed in claim 1, wherein the debugging interruption is triggered when the program counter satisfies a predetermined condition, or when an externally coupled device interrupts the embedded system.

* * * * *